United States Patent [19]

Land et al.

[11] 4,182,561
[45] Jan. 8, 1980

[54] FAST CHARGING ELECTRONIC FLASH DEVICE

[75] Inventors: Edwin H. Land, Cambridge; Conrad H. Biber, Needham, both of Mass.

[73] Assignee: Polaroid Corporation, Cambridge, Mass.

[21] Appl. No.: 930,863

[22] Filed: Aug. 3, 1978

[51] Int. Cl.² .................................................. G03B 15/03
[52] U.S. Cl. .................................................. 354/145
[58] Field of Search .................................. 354/32–35, 354/126, 129, 149, 139; 315/209 SC, 241 R, 241 P

[56] References Cited

U.S. PATENT DOCUMENTS

| | | | |
|---|---|---|---|
| 2,531,220 | 11/1950 | Kaplan | 315/219 |
| 2,722,629 | 11/1955 | Germeshausen | 315/163 |
| 2,724,792 | 11/1955 | Nessel | 315/234 |
| 2,983,850 | 5/1961 | Edgerton | 315/241 R |
| 3,146,391 | 8/1964 | Walker | 315/241 R UX |
| 3,288,044 | 11/1966 | Bramer | 315/241 R UX |
| 3,475,651 | 10/1969 | Harding et al. | 315/242 |
| 3,514,669 | 5/1970 | Helmuth | 315/241 R |
| 3,563,805 | 2/1971 | Deierhol | 136/111 |
| 3,617,387 | 11/1971 | Grulke | 136/111 |
| 3,734,780 | 5/1973 | Bilhorn et al. | 136/111 |
| 3,770,504 | 11/1973 | Bergum | 136/111 X |
| 3,791,278 | 2/1974 | Biber et al. | 354/32 UX |
| 3,820,128 | 6/1974 | Burgarella et al. | 354/32 |
| 3,858,227 | 12/1974 | Ellin et al. | 354/145 |
| 3,917,395 | 11/1975 | Ogawa | 354/149 X |
| 4,062,027 | 12/1977 | Miyazaki et al. | 354/32 X |
| 4,064,519 | 12/1977 | Kee | 354/149 X |
| 4,074,295 | 2/1978 | Kee | 354/145 |
| 4,084,167 | 4/1978 | Iwata | 354/35 X |

*Primary Examiner*—Donald A. Griffin
*Attorney, Agent, or Firm*—Edward S. Roman

[57] ABSTRACT

An electronic flash device is preferably powered by a high voltage, generally planar multicell battery having a low internal impedance and a high current discharge capability to enable a flash storage capacitor to be quickly charged upon the battery being directly connected to the capacitor. Actuation of a photographic cycle initiating button on an associated camera operates to directly connect the battery to the flash storage capacitor thereby enabling the capacitor to be quickly charged to its required voltage in readiness to provide an illuminating flash of light during the exposure interval which commences at a minute time after the button actuation.

11 Claims, 2 Drawing Figures

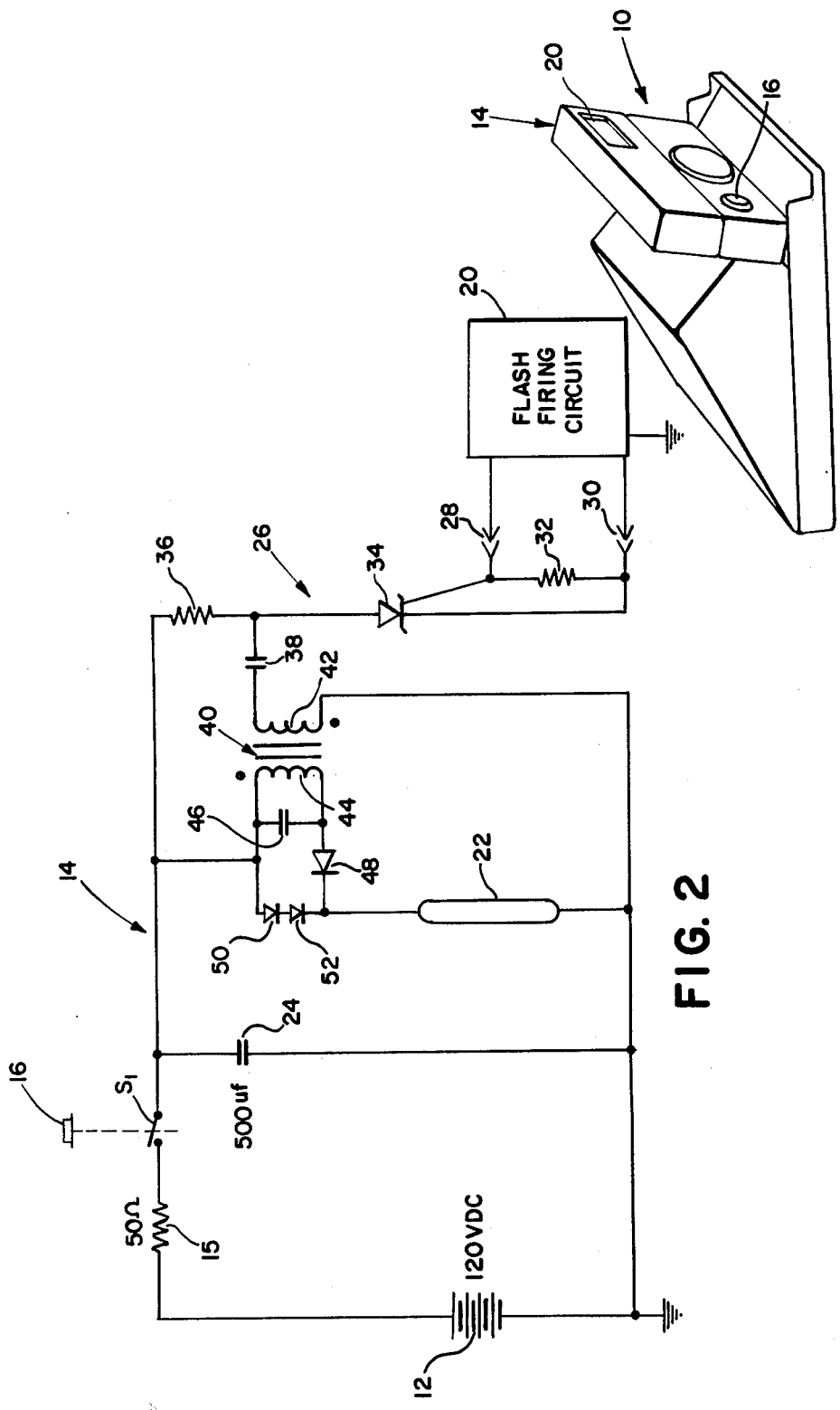

FAST CHARGING ELECTRONIC FLASH DEVICE

BACKGROUND OF THE INVENTION

1. Field of the Invention

This invention relates to a fast charging electronic flash device and more particularly, to an electronic flash device which commences charging in response to actuation of a camera photographic cycle initiating button and which thereafter quickly charges in readiness to provide an illuminating flash of light at an appropriate instant during the exposure interval.

2. Description of the Prior Art The Polaroid SX-70 Land Camera made and sold by the Polaroid Corporation, Cambridge, Massachusetts, U.S.A. is adapted to make photographs automatically either by ambient light or by the aid of a flash lamp array. It is highly desirable to extend the capabilities of the Polaroid SX-70 Land Camera and other such cameras as the new Polaroid Pronto! Camera for use with electronic flash. One type of electronic flash device or strobe particularly suitable for use with Polaroid's SX-70 Land Camera as disclosed in U.S. Pat. No. 4,074,295, entitled "Compact Accessory Strobe for Cameras with Battery Enclosed Film Pack", by R. Kee, issued Feb. 14, 1978, is directed to a compact strobe which is powered directly from the camera by way of a battery located within a film cassette. This strobe, as well as other strobes, that have been provided for use with such cameras utilize a low voltage battery supply together with a voltage converter circuit for charging a storage capacitor to a relatively high voltage suitable for discharge through a flash tube to provide an illuminating flash of light. The time required for the converter to charge the capacitor to the required voltage is generally of such a long duration that the photographer must first turn on a power control switch to energize the electronic flash device and then wait for the voltage converter to charge the storage capacitor to the required voltage before the camera can be actuated to provide a photographic exposure cycle. The photographer is generally made aware of when the electronic flash device reaches a satisfactory charge condition by the turning on of a ready light which signals him that he may now proceed with the actual camera exposure. The time during which the photographer must wait for the electronic flash device to become fully charged prior to actuating the camera shutter button thus presents an obvious disadvantage to the electronic flash in comparison with an ordinary flash lamp.

Therefore, it is a primary object of this invention to provide a fast charging electronic flash device wherein the photographer is not required to first turn on the power to the strobe voltage converter and then wait for the strobe capacitor to become fully charged as a precondition to commencing the photographic operation.

It is a further object of this invention to provide an electronic flash device which charges so quickly that it may be used in the manner of an ordinary flash lamp.

It is another object of this invention to provide a fast charging electronic flash device for use with SX-70 Land Cameras and other such cameras wherein the electronic flash device may be fully charged within the minute time from when the photographer first depresses the photographic cycle initiating button to the instant of first light during the exposure interval.

Other objects of the invention will in part be obvious and will in part appear hereinafter. The invention accordingly comprises the mechanism and system possessing the construction, the combination of elements and the arrangement of parts which are exemplified in the following detailed disclosure.

SUMMARY OF THE INVENTION

An electronic flash unit of the type powered by a substantially steady state voltage source is provided for use with a camera of the type having a manually actuable photographic cycle initiating switch and an exposure control system responsive to the manual actuation of the photographic cycle initiating switch for initiating a photographic exposure interval at a minute time subsequent to the manual actuation of the switch. The exposure control system then operates to provide a flash fire trigger signal during the exposure interval. The flash unit comprises a housing, a storage capacitor and a flash discharge tube. There is also provided a circuit for receiving the steady state voltage supply and for connecting a steady state voltage supply directly to the storage capacitor in order to charge the capacitor to the steady state voltage in response to the manual actuation of the photographic cycle initiating switch. The capacitor thereafter is charged by the steady state voltage supply to substantially the steady state voltage within the minute time between the manual actuation of the photographic cycle initiating switch and the actual commencement of the photographic exposure interval. The circuit also includes a trigger circuit which responds to the trigger signal provided by the camera for discharging the capacitor through the discharge tube to produce an illuminating flash of light.

BRIEF DESCRIPTION OF THE DRAWINGS

The novel features that are considered characteristic of the invention are set forth with particularity in the appended claims. The invention itself, however, both as to its organization and its method of operation together with other objects and advantages thereof, will be best understood from the following description of the illustrative embodiment when read in connection with the accompanying drawings or when like members have been employed in the different figures to note the same parts and wherein:

FIG. 1 is a perspective view of the electronic flash device and camera arrangement of this invention; and FIG. 2 is a schematic diagram of the circuit for electronic flash device of FIG. 1.

DESCRIPTION OF THE PREFERRED EMBODIMENT

Referring now to FIG. 1, there is shown generally at 10 an automatic single lens reflex photographic camera sold by Polaroid Corporation, Cambridge, Massachusetts, under the trademark "SX-70". Such cameras have highly automated systems for controlling photographic exposure and processing operations in a manner as is more fully described in U.S. Pat. No. 3,791,278, entitled "Photographic Apparatus with Solenoid Powered Instrumentalities", by C. Biber, issued Feb. 12, 1974 and U.S. Pat. No. 3,820,128, entitled "Flash Photographic Control System", by J. Burgarella, issued June 25, 1974. The automatic exposure control system described in the aforementioned patents are actuated to control an automatic exposure cycle in a well-known manner upon the manual actuation of a photographic cycle initiating button as shown at 16. Since the camera 10 is of the single lens reflex type, the exposure control system operates in response to the manual actuation of the button 16 to first close the shutter blades in order to inhibit the admission of scene light to the exposure chamber and to then pivot a reflex mirror upwardly into an exposure reflecting position prior to the commencement of the actual exposure interval. Such exposure control operations which are performed subsequent to the manual actuation of the button 16 and prior to the commencement of the actual exposure interval occur in a minute time generally in the order of 100–300 m sec as taught by U.S. Pat. No. 3,791,278 supra.

The automatic camera 16 may be provided with a fast charging electronic flash device or strobe as shown generally at 14 which may be formed either as an integral part of the camera 10 or alternatively may be made as a detachable accessory if so desired. The electronic flash device 14 comprises an electronic charging and firing circuit as schematically shown in FIG. 2. The circuit is powered by a steady state voltage source preferably comprising a flat multicell battery characterized by both a low internal impedence as well as a high current discharge rate as will be subsequently described.

Flat multicell batteries of the general types disclosed in U.S. Pat. Nos. 3,563,805, entitled "Thin, Flat Primary Cells and Batteries", by W. Deierhoi, Jr. issued Feb. 16, 1971; 3,617,387, entitled "Battery Construction Having Cell Components Completely Internally Bonded With Adhesive", by C. Berea, issued Nov. 2, 1971; and 3,734,780, entitled "Flat Cell Battery With Both Terminals on One Face", by J. Bilhorn, et al, issued May 22, 1973 are presently employed commercially to operate the various electrically powered systems of the automatic camera 10 in a well-known manner.

The flat multicell battery 12 may preferably comprise a plurality of series connected cells having a multiplicity of electrically conductive layers which include, for each cell, a positive electrode layer, a negative electrode layer, and an electrolyte containing layer disposed between and separating the positive and negative electrodes. Adjacent cells of the battery may be electrically connected one to the other by means of an electrolyte impervious intercell connector layer which is disposed between and in contacting relationship with each pair of adjacent cells. The flat multicell battery may thus be provided with a minimized internal impedance as well as a capability for a high discharge rate at current densities exceeding 100 milliamperes per square inch of anode as is fully described in U.S. Pat. No. 3,770,504, entitled "High Discharge Rate Multicell Battery", by D. Bergum, issued Nov. 6, 1973.

The multicell flat battery 12 is preferably manufactured in accordance with the teaching of U.S. patent application Ser. No. 761,651, entitled "Electrical Cells and Batteries", by E. H. Land and comprises twenty serially stacked flat cells providing an output steady state voltage of 120 VDC with an internal impedance in the order of 4–6Ω.

The battery 12 is directly connected in charging relation with respect to a storage capacitor 24 upon the closure of a photographic cycle initiating switch $S_1$. As is readily apparent, the switch $S_1$ is closed in direct response to the manual actuation of the photographic cycle initiating button 16 and operates to actuate the aforementioned exposure control system of the automatic camera 10 in a manner as disclosed in U.S. Pat. No. 3,820,128, supra, while at the same time directly connecting the battery 12 to the storage capacitor 24 in order to charge the capacitor 24 to the 120 VDC battery voltage. A current limiting resistor in the order of 50Ω as shown at 15 may be provided in series connected with respect to the switch $S_1$ and the storage capacitor 24 is preferably selected to be in the order of 500 mf.

The low internal impedance of the battery 12 together with its high discharge efficiency in combination with the high value of the capacitor 24 provide an extremely fast capacitor charge time in the order of 200 microseconds. Thus, the storage capacitor 24 may be charged within the minute time between the manual actuation of the photographic cycle initiating switch $S_1$ and the actual commencement of the photographic exposure interval thereby eliminating the necessity for providing a separate on-off switch to control the charging of the electronic flash device 14 as heretofore required.

The storage capacitor 24 is connected to discharge through a flash discharge tube 22 to provide an illuminating flash of light upon the triggering of the flash tube by a series of trigger circuit as shown generally at 26. The trigger circuit 26 comprises a pulse transformer 40 having primary and secondary windings 42 and 44 respectively. The second winding 44 is preferably connected in parallel relation with respect to a resonance capacitor 46 to define a resonant circuit which in turn is preferably connected in series to a decoupling diode 48. The aforementioned resonant circuit and diode 48 are, in turn, shunted by two serially connected diodes, 50 and 52, to define a trigger pulse circuit connected in serial relation to the flash discharge tube 22. Each diode 50 and 52, preferably has a peak inverse voltage characteristic of 1,500 V for reasons which will become apparent from the following discussion.

The primary winding 42 is grounded at one end with the other end connected in serial relation to a capacitor 38 which, in turn, is charged by the battery 12 through a resistor 36 upon closure of the photographic cycle initiating switch $S_1$. The junction between the capacitor 38 and the resistor 36 is connected to the anode of an SCR 34, and the cathode of the SCR 34, in turn, is connected to a flash firing circuit 20 by way of a terminal 30. The flash firing circuit 20 is preferably part of the aforementioned exposure control system of the automatic camera 10 and is fully described in U.S. Pat. Nos. 3,820,128 and 3,858,227, supra. The gate of the SCR 34 is also connected to the flash firing circuit 20 by way of another terminal 28 so as to receive a flash fire signal at the appropriate interval during an exposure interval in a manner as is fully described in U.S. Pat. No. 3,820,128, supra.

In the case where the electronic flash device 14 is detachable from the automatic camera 10 in order to facilitate the use of an ordinary flash lamp array in place of the electronic flash device, there may be provided a resistor 32, between the gate and cathode of the SCR 34, having an impedance selected to correspond with the impedance value of an unfired flash lamp for reasons which are fully described in U.S. Pat. No. 3,858,227, supra. Alternatively, it may be desirable to provide a voltage monitoring circuit for monitoring the charge on the capacitor 24 and providing a signal to the terminals 28 and 30 to enable the camera exposure control system, by way of the flash firing circuit 20, to conduct an automatic exposure cycle only upon the capacitor 24 from being charged to a minimum voltage in a manner as is fully described in U.S. Pat. No. 4,064,519, entitled "Regulated Strobe for Camera with Sixth Flash Inhibit", by R. Kee, issued Dec. 20, 1977.

Operation of the camera and strobe arrangement of FIG. 1 may proceed as follows. In order to commence an electronic flash illuminated photographic exposure cycle, the photographer need only manually actuate the button 16 which immediately closes the switch $S_1$ and commences the automatic exposure cycle of the camera 10 in the manner disclosed in U.S. Pat. No. 3,820,128, supra, while simultaneously charging the capacitor 24 to the 120 VDC output of the battery 12. As previously discussed, the automatic exposure control means of the camera 10 requires a minute time in the order of 100–300 milliseconds from the manual actuation of the button 16 and the closure of the switch $S_1$ to the instant that the actual exposure interval is commenced. However, as a result of the minimum internal impedance and high discharge efficiency of the battery 12 together with the high capacitance value of the capacitor 24, there is only required a maximum charging time in the order of 200 microseconds for the capacitor 24 to substantially reach its fully charged value of 120 VDC. In this manner, the electronic flash device 10 is automatically made ready for firing without the conscious effort of the photographer first turning on the power to the strobe and then waiting for the strobe to become fully charged before initiating the camera photographic cycle. Thus, the electronic device 10 acquires the ease of operation normally attributable to an ordinary flash lamp without the added expense of providing a new flash lamp for each exposure.

Subsequent to the commencement of the exposure interval, the flash fire circuit 20 provides a gating pulse in a manner as disclosed in U.S. Pat. No. 3,820,128, supra, to gate the SCR 34 into conduction. As is now readily apparent, closure of the switch $S_1$ also operated to substantially charge the capacitor 38 to 120 VDC prior to the gating of the SCR 34 into conduction. Thus, gating the SCR 34 into conduction operates to ground its anode terminal and thereby apply a triggering pulse to the primary winding 42 of the transformer 40. The triggering pulse, in turn is stepped up by the transformer 40 to a peak voltage in the order of 3 KV which pulse is then applied by way of the decoupling diode 48 to trigger the flash tube 22 into conduction. Once conducting, the main discharge current through the flash tube 22 is provided from the capacitor 24 by way of the shunting diodes 50 and 52. As is readily apparent, the primary winding 42 is phased with respect to the secondary winding 44 to apply a triggering pulse to the discharge tube 22 of opposite polarity to that of the capacitor 24 discharge through the flash tube 22. Thus, the triggering pulse provided by the transformer 40 is of opposite plurality to that of the discharge current from the capacitor 24 through the shunting diodes 50 and 52 as is described in U.S. Pat. No. 3,475,651, entitled "Charging and Triggering Circuits for Pulse Electrical Devices Such As Flash Lamps", by G. Harding, et al, issued Oct. 38, 1969.

In this manner, the flash tube 22 is triggered to discharge the capacitor 24 at the appropriate instant during the photographic exposure interval in order to provide an illuminating flash of light. Since the storage capacitor 24 is charged immediately prior to its discharge through the flash tube 22, it is possible that the capacitor 24 may be selected without particular regard to its leakage characteristics. Thus, it is possible to select a relatively inexpensive capacitor thereby further reducing the cost of the electronic flash device 14.

Although the electronics flash device 14 has been herein described for use with the SX-70 camera, it will be readily appreciated that the electronic flash device 14 may also be used with the other types of cameras such as Polaroid's Pronto! and One Step cameras which also provide a minute time between the actuation of the photographic cycle initiating button and the commencement of the actual exposure interval.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. An electronic flash unit of the type powered by a steady state voltage source for use with a camera of the type having a photographic cycle initiating switch manually actuable from a first to a second position and an exposure control system responsive to the manual actuation of the photographic cycle initiating switch from its first to its second position for initiating a photographic exposure interval at a minute time subsequent to the manual actuation of the switch, and for thereafter providing a flash firing trigger signal during the exposure interval, said flash unit comprising:

a housing,
a fast charging storage capacitor;
a flash discharge tube; and
circuit means for receiving the steady state voltage supply and for connecting the steady state voltage supply directly to said storage capacitor in order to charge said capacitor to the steady state voltage in response to the manual actuation of the photographic cycle initiating switch from its first to its second position, said capacitor thereafter being charged by the steady state voltage supply to substantially the steady state voltage within the minute time between the manual actuation of the photographic cycle initiating switch and the actual commencement of the photographic exposure interval, said circuit means also including trigger circuit means responsive to the trigger signal for discharging said capacitor through said discharge tube to produce an illuminating flash of light.

2. The electronic flash unit of claim 1 wherein said trigger circuit means includes a transformer having a primary winding connected to receive an input voltage pulse responsive to the camera trigger signal and a secondary winding connected in series relation with respect to said flash discharge tube and having a phase relationship with respect to said primary winding so as to apply a triggering pulse to said discharge tube of opposite polarity to that of said capacitor discharge through said flash tube, said trigger circuit means additionally including at least one diode connected in parallel shunting relation with respect to said secondary winding such that said triggering pulse operates to reverse bias said diode while said capacitor discharge through said flash tube operates to forward bias said diode.

3. The electronic flash unit of claim 1 wherein the minute time between the manual actuation of the photographic cycle initiating switch and the actual commencement of the photographic exposure interval within which said capacitor is charged by the steady state voltage supply to substantially the steady state voltage is generally less than 300 milliseconds.

4. The electronic flash unit of claim 1 wherein the steady state voltage source comprises a substantially low impedance flat multicell battery having a steady state output voltage in the order of 120 VDC and said storage capacitor comprises a capacitor having a value of at least 500 mf.

5. The electronic flash unit of claim 1 wherein the steady state voltage supply is directly connected to said capacitor by way of a resistive element.

6. A camera apparatus including an electronic flash device of the type powered by a steady state voltage source, said camera apparatus comprising:
   a photographic cycle initiating switch, manually actuable from a first to a second position;
   means responsive to the manual actuation of said photographic cycle initiating switch from its said first to its said second position for initiating a photographic exposure interval at a minute time subsequent to the manual actuation of said switch and for thereafter providing a flash firing trigger signal during the exposure interval;
   a fast charging storage capacitor;
   a flash discharge tube; and
   circuit means for receiving the steady state voltage supply and for connecting the steady state voltage supply directly to said storage capacitor in order to charge said capacitor to the steady state voltage in response to the manual actuation of said photographic cycle initiating switch from its said first to its said second position, said capacitor thereafter being charged by the steady state voltage supply to substantially the steady state voltage within the minute time between the manual actuation of the photographic cycle initiating switch and the actual commencement of the photographic exposure interval, said circuit means also including trigger circuit means responsive to said trigger signal for discharging said capacitor through said discharge tube to produce an illuminating flash of light.

7. The camera apparatus of claim 6 wherein said trigger circuit means including a transformer having a primary winding connected to receive an input voltage pulse responsive to the camera trigger signal and a secondary winding connected in series relation with respect to said flash discharge tube and having a phase relationship with respect to said primary winding so as to apply a triggering pulse to said discharge tube of opposite polarity to that of said capacitor discharge through said flash tube, said trigger circuit means additionally including at least one diode connected in parallel shunting relation with respect to said secondary winding such that said triggering pulse operates to reverse bias said diode while said capacitor discharge through said flash tube operates to forward bias said diode.

8. The camera apparatus of claim 6 wherein the minute time between the manual actuation of said photographic cycle initiating switch and the actual commencement of the photographic exposure interval within which said capacitor is charged by the steady state voltage supply to substantially the steady state voltage is generally less than 300 milliseconds.

9. The camera apparatus of claim 6 wherein the steady state voltage source comprises a substantially low impedance flat multicell battery having a steady state output voltage in the order of 120 VDC and said storage capacitor comprises a capacitor having a value of at least 500 mf.

10. The camera apparatus of claim 6 wherein the steady state voltage is directly connected to said capacitor by way of a resistive element.

11. An electronic flash unit of the type powered by a steady state voltage source for use with a camera of the type having a photographic cycle initiating switch manually actuable from a first to a second position and an exposure control system responsive to the manual actuation of the photographic cycle initiating switch from its first to its second position for initiating a photographic exposure interval at a minute time subsequent to the manual actuation of the switch, and for thereafter providing a flash firing trigger signal during the exposure interval, said flash unit comprising:
    a housing;
    a flash discharge tube; and
    circuit means for receiving the steady state voltage supply and for connecting to the steady state voltage supply in order to store the steady state voltage in response to the manual actuation of the photographic cycle initiating switch from its first to its second position, said circuit means thereafter being charged by the steady state voltage supply to substantially the steady state voltage within the minute time between the manual actuation of the photographic cycle initiating switch and the actual commencement of the photographic exposure interval, said circuit means also including trigger circuit means responsive to the trigger signal for discharging said stored steady state voltage through said discharge tube to produce an illuminating flash of light.

* * * * *